United States Patent
Kwatra et al.

(10) Patent No.: US 11,721,338 B2
(45) Date of Patent: Aug. 8, 2023

(54) CONTEXT-BASED DYNAMIC TOLERANCE OF VIRTUAL ASSISTANT

(71) Applicant: INTERNATIONAL BUSINESS MACHINES CORPORATION, Armonk, NY (US)

(72) Inventors: Shikhar Kwatra, Raleigh, NC (US); Zachary A. Silverstein, Jacksonville, FL (US); Robert Huntington Grant, Marietta, GA (US); Ashraf Mahmoud Mohamed Ahmed Awwad, Mississauga (CA)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 17/003,342

(22) Filed: Aug. 26, 2020

(65) Prior Publication Data

US 2022/0068272 A1  Mar. 3, 2022

(51) Int. Cl.
*G10L 15/22* (2006.01)
*G10L 15/06* (2013.01)
*G10L 15/08* (2006.01)

(52) U.S. Cl.
CPC ............ *G10L 15/22* (2013.01); *G10L 15/063* (2013.01); *G10L 2015/088* (2013.01)

(58) Field of Classification Search
CPC .. G10L 15/22; G10L 15/063; G10L 2015/088
See application file for complete search history.

(56) References Cited

U.S. PATENT DOCUMENTS

| | | | |
|---|---|---|---|
| 8,209,175 B2 | 6/2012 | Mukerjee | |
| 9,875,494 B2 | 1/2018 | Kalns | |
| 10,074,364 B1* | 9/2018 | Wightman | ............. G10L 17/04 |
| 10,217,453 B2 | 2/2019 | Stevans | |

(Continued)

OTHER PUBLICATIONS

Alsina-Pages et al., "homeSound: Real-Time Audio Event Detection Based on High Performance Computing for Behaviour and Surveillance Remote Monitoring," Sensors (Basel) Apr. 2017, 17(4): 854, Published online Apr. 13, 2017, 22 pages.

(Continued)

*Primary Examiner* — Mohammad K Islam
(74) *Attorney, Agent, or Firm* — Rakesh Roy

(57) ABSTRACT

A method, computer system, and a computer program product for context-based wake word threshold modification is provided. The present invention may include receiving an audio data generated by a computing device operating in a sleep mode. The present invention may include processing the received audio data to determine a context associated with a user of the computing device. The present invention may include in response to detecting a potential wake word in the received audio data, calculating a wake word confidence score associated with an accuracy of the detected potential wake word. The present invention may include retrieving a wake word threshold, wherein the wake word threshold is determined based on the context associated with the user of the computing device. The present invention may include, in response to the calculated wake word confidence score exceeding the retrieved wake word threshold, activating a wake mode of the computing device.

17 Claims, 10 Drawing Sheets

(56) References Cited

U.S. PATENT DOCUMENTS

| | | | |
|---|---|---|---|
| 10,366,699 B1* | 7/2019 | Dharia | G10L 25/78 |
| 10,438,584 B2 | 10/2019 | Ni | |
| 10,445,115 B2 | 10/2019 | Brown | |
| 10,452,695 B2 | 10/2019 | Rodgers | |
| 10,475,446 B2 | 11/2019 | Gruber | |
| 11,355,102 B1* | 6/2022 | Mishchenko | G10L 15/16 |
| 2013/0204813 A1 | 8/2013 | Master | |
| 2014/0337031 A1* | 11/2014 | Kim | G06F 3/167 |
| | | | 704/251 |
| 2015/0081296 A1* | 3/2015 | Lee | G10L 15/20 |
| | | | 704/251 |
| 2016/0077794 A1 | 3/2016 | Kim | |
| 2018/0130469 A1* | 5/2018 | Gruenstein | G10L 25/51 |
| 2018/0218734 A1* | 8/2018 | Somech | G06N 20/00 |
| 2018/0315415 A1 | 11/2018 | Mosley | |
| 2019/0005021 A1 | 1/2019 | Miller | |
| 2019/0005953 A1* | 1/2019 | Bundalo | G06F 1/3287 |
| 2019/0205727 A1 | 7/2019 | Lin | |
| 2019/0221206 A1* | 7/2019 | Chen | G10L 15/22 |
| 2019/0295544 A1 | 9/2019 | Garcia | |
| 2019/0324527 A1* | 10/2019 | Presant | G06Q 10/00 |
| 2019/0371342 A1* | 12/2019 | Tukka | H04M 1/724 |
| 2020/0058299 A1* | 2/2020 | Lee | G10L 15/1815 |
| 2020/0184966 A1* | 6/2020 | Yavagal | G10L 15/30 |
| 2021/0005181 A1* | 1/2021 | Abed | G10L 15/08 |
| 2021/0390948 A1* | 12/2021 | Shah | G10L 15/22 |
| 2022/0262352 A1* | 8/2022 | Tian | G06F 40/279 |

OTHER PUBLICATIONS

Brdiczka, "Learning Situation Models for Providing Context-Aware Services," Human-Computer Interaction [cs.HC], Institut. National Polytechnique de Grenoble—INPG, 2007, English. tel-00151497, https://tel.archives-ouvertes.fr/tel-00151497/document, 163 pages.

Chowdhury, "Avoidance Attitudes Towards Virtual Assistants," Coventry University, Thesis Apr. 2018, DOI: 10.13140/RG.2.2.23455.25767, https://www.researchgate.net/publication/325195832, 61 pages.

Kepuska, "Wake-Up-Word Speech Recognition," Speech Technologies, Prof. Ivo Ipsic (Ed.), ISBN 978-953-307-996-7, InTech, Available from: http://www.intechopen.com/books/speech-technologies/wake-upword-speech-recognition, 28 pages.

Li et al.; "Intrinsic Motivation in Virtual Assistant Interaction", ISASE 2019, 5th International Symposium on, pp. 1-5, Mar. 17-18, 2019.

Liono et al., "Building a Benchmark for Task Progress in Digital Assistants," TI@WSDM19, Feb. 15, 2019, Melbourne, Australia, https://taskintelligence.github.io/WSDM2019-Workshop/papers/TIWSDM19_Liono.pdf, 6 pages.

Mell et al., "The NIST Definition of Cloud Computing", National Institute of Standards and Technology, Special Publication 800-145, Sep. 2011, 7 pages.

Sun et al., "Collaborative Intent Prediction With Real-Time Contextual Data," ACM Transactions on Information Systems, vol. 1, No. 1, Article 1. Publication date: Jan. 2017, pp. 1-1:33.

Sun et al.; "Contextual Intent Tracking for Personal Assistants", KDD'16 22nd ACM SIGKDD International Conference on, pp. 273-282, Aug. 13-17, 2016.

* cited by examiner

CONTEXT-BASED DYNAMIC TOLERANCE OF VIRTUAL ASSISTANT

BACKGROUND

The present invention relates generally to the field of computing, and more particularly to virtual assistant systems.

Computer devices with virtual assistants are becoming more common in home and office settings. One of the ways in which users can interact with these virtual assistants is via speech. Although virtual assistants can be useful, limitations in current speech recognition systems often lead to virtual assistants misunderstanding user utterances. One issue that users face is the accidental waking or activation of a virtual assistant, triggered by misunderstanding user utterances that are not directed towards the virtual assistant.

SUMMARY

Embodiments of the present invention disclose a method, computer system, and a computer program product for context-based wake word threshold modification. The present invention may include receiving an audio data generated by a computing device operating in a sleep mode. The present invention may include processing the received audio data to determine a context associated with a user of the computing device. The present invention may include in response to detecting a potential wake word in the received audio data, calculating a wake word confidence score associated with an accuracy of the detected potential wake word. The present invention may include retrieving a wake word threshold, wherein the wake word threshold is determined based on the context associated with the user of the computing device. The present invention may include, in response to the calculated wake word confidence score exceeding the retrieved wake word threshold, activating a wake mode of the computing device.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
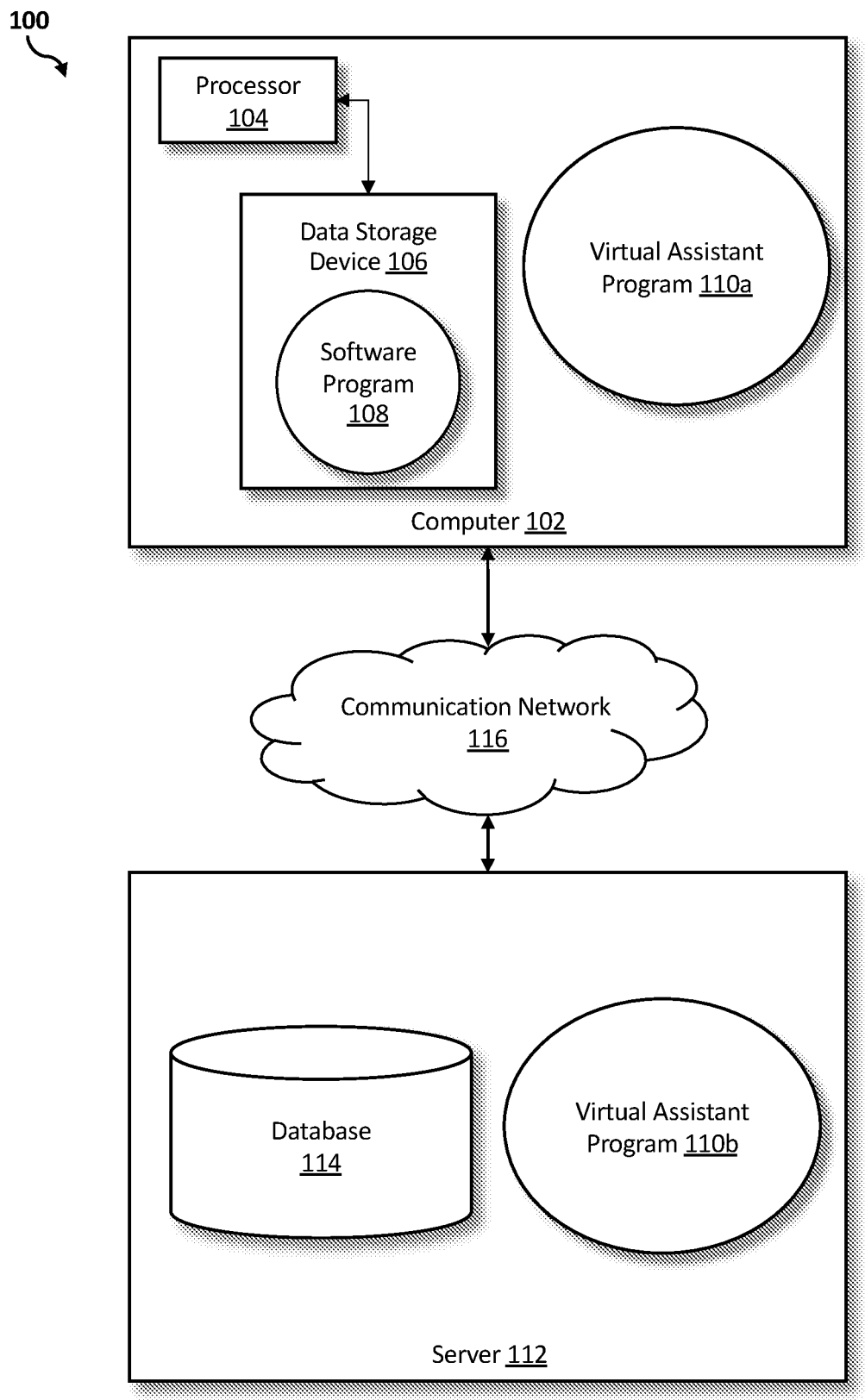
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for dynamically modifying an activation threshold of a virtual assistant based on user context. As such, the present embodiment has the capacity to improve the technical field of speech recognition systems for human-computer interactions by leveraging the data ingested from surrounding audio, conversations, social activities, and user preferences data in virtual assistants in order to build a user profile and dynamically modify the tolerance threshold for a wake word for the virtual assistant depending on the user's context. More specifically, a virtual assistant device may be installed, and a user profile associated with the user of the virtual assistant device may be initialized. The user profile may include user preferences, such as, a success threshold for wake word speech recognition. In a sleep or standby mode, the virtual assistant device may actively monitor audio data input to detect a wake word, while passively processing the audio data input to determine a current room context. Then, as the room context is ascertained, the threshold for wake word certainty may be dynamically modified to match the current context. Next, responsive to detecting a potential wake word in the captured audio data, the virtual assistant device may determine whether the captured word passes the context-based threshold for wake word certainty. If the captured word passes the threshold, the virtual assistant device may be activated to a wake mode. However, if the captured word does not pass the threshold, the virtual assistant device may maintain the sleep mode.

As described previously, computing devices with virtual assistants are becoming more common in home and office settings. One of the ways in which users can interact with these virtual assistants is via speech. Although virtual assistants can be useful, limitations in current speech recognition systems often lead to virtual assistants misunderstanding user utterances. One issue that users face is the accidental waking or activation of a virtual assistant, triggered by misunderstanding user utterances that are not directed towards the virtual assistant.

Therefore, it may be advantageous to, among other things, provide a way to dynamically modify a virtual assistant's tolerance threshold for wake word certainty based on a nearby user's context. By enabling a context-aware system, the virtual assistant may integrate seamlessly with the user's environment and provide smart personalized services.

According to at least one embodiment, hardware such as smart speakers and other cognitive devices may facilitate interactions between a user and a virtual assistant. Cognitive devices typically include a listening component that continuously listens for a wake word from a user. When the wake word is detected, the virtual assistant is activated to perform various tasks based on processing voice commands from the user.

According to one embodiment, a virtual assistant device may be installed in a household and a user may set one or more success thresholds on the virtual assistant device for waking the device. In one embodiment, the virtual assistant's sleep functionality may check for the wake word and the current room context at all times, while the virtual assistant device is connected to a power source. In one embodiment, the virtual assistant device may leverage high quality audio capture to detect the context/situation in the room. In some embodiments, the virtual assistant device may leverage machine learning to learn various contexts from training sets. In various embodiments, Mel Frequency Cepstral Coefficients (MFCC) based speech feature extraction and speaker identification may be used as an overlay to a Region-based Convolutional Neural Network (R-CNN) mechanism for determining the context. This may enable feature extraction and feature matching based on identifying the speaker in correlation with the context.

According to one embodiment, as the room context is ascertained, the wake word threshold may be dynamically moved to match the current room context/situation. The threshold for wake word certainty may be directly correlated to an assumed/probable room context. In one embodiment, when the context in the room has changed, the virtual assistant device may return to a default wake word threshold.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a virtual assistant program 110a. The networked computer environment 100 may also include a server 112 that is enabled to run a virtual assistant program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 8, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the virtual assistant program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the virtual assistant program 110a, 110b (respectively) to leverage data ingested from surrounding audio, conversation, social activities, and user preferences in order to build a user profile and dynamically modify the wake word threshold for the virtual assistant device based on the user's context. The virtual assistant system and method are explained in more detail below with reference to FIGS. 2 to 7.

Figure 2:
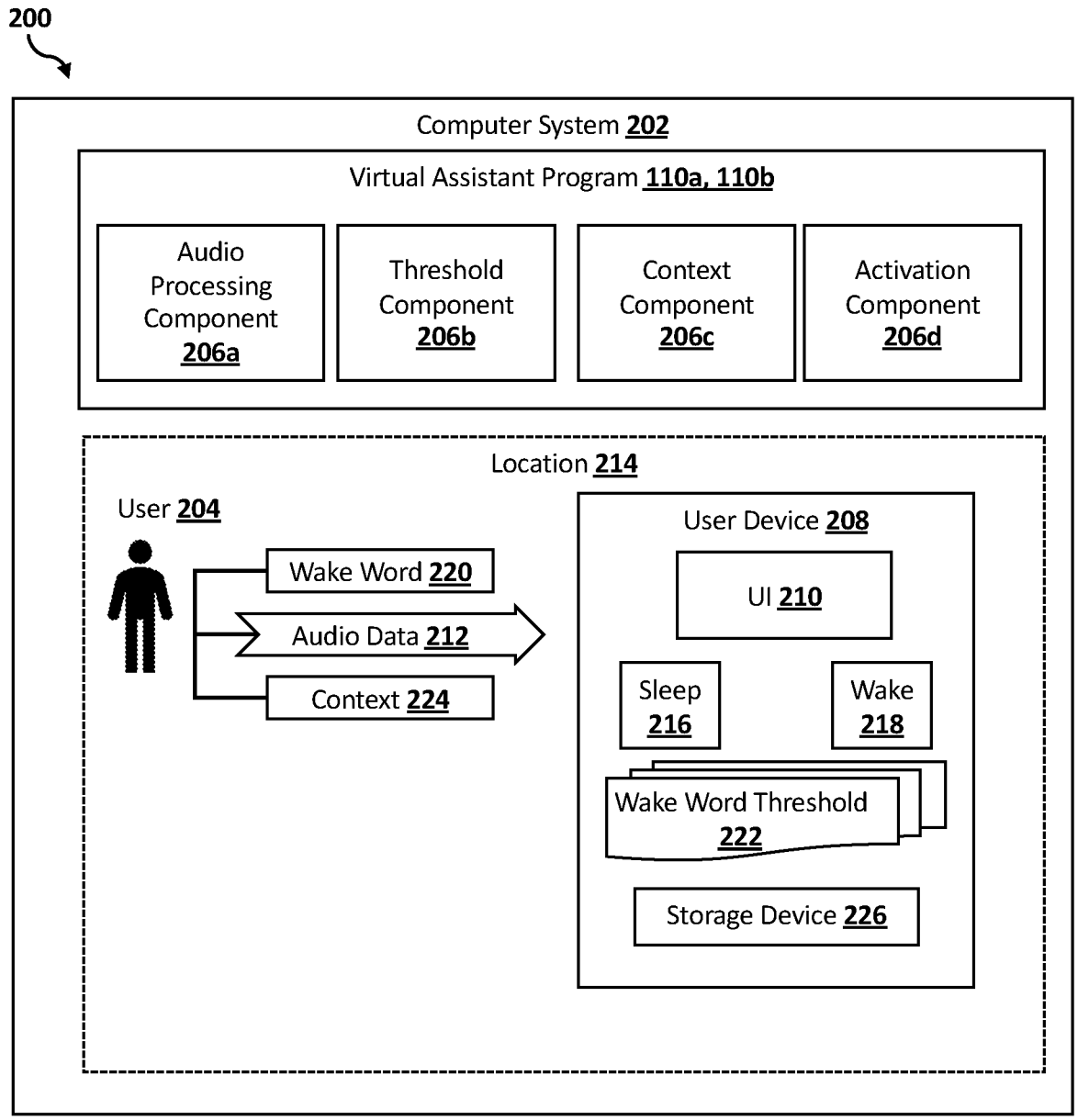
FIG. 2 is a schematic block diagram of a virtual assistant computer environment according to at least one embodiment.

Referring now to FIG. 2, a schematic block diagram of a virtual assistant computer environment 200 implementing the virtual assistant program 110a, 110b according to at least one embodiment is depicted. According to one embodiment, the virtual assistant computer environment 200 may include one or more components of the computer environment 100 discussed above with reference to FIG. 1.

In one embodiment, a virtual assistant program 110a, 110b running on a computer system 202 (e.g., executed on a tangible storage device 106 and/or database 114) may be implemented to interact with a user 204. The computer system 202 may include one or more computing devices (e.g., desktop, laptop, smart speaker, mobile device, tablet, kiosk, car dashboard, voice response unit) linked through a communication network (e.g., communication network 116). In illustrative embodiments, the computer system 202 may include one or more client computers 102 and one or more server computers 112, as shown in FIG. 1.

According to one embodiment, the virtual assistant program 110a, 110b may be implemented using hardware components, software components, or a combination of both. The virtual assistant program 110a, 110b may include a single computer program or multiple program modules or sets of instructions being executed by processors of the computer system 202. The virtual assistant program 110a, 110b may include routines, objects, components, units, logic, data structures, and actions that may perform particular tasks or implement particular abstract data types. The virtual assistant program 110a, 110b may be practiced in distributed cloud computing environments where tasks are performed by remote processing devices that may be linked through a communication network (e.g., communication network 116). In one embodiment, the virtual assistant program 110a, 110b may include program instructions that may be collectively stored on one or more computer-readable storage media. In one embodiment, the virtual assistant program 110a, 110b may at least include an audio processing component 206a, a threshold component 206b, a context component 206c, and an activation component 206d, as will be further detailed below.

According to one embodiment, the computer system 202 may include a user device 208. In one embodiment, user device 208 may include a user interface (UI) 210 configured to enable the user 204 to interact with virtual assistant program 110a, 110b to provide one or more virtual assistant services to a user 204. In one embodiment, UI 210 may include a voice user interface (VUI) to enable the user device 208 to receive verbal input from the user 204. According to one embodiment, the UI 210 may include a web interface or a graphical user interface (GUI) configured to display (e.g., output) graphical or textual data from the virtual assistant program 110a, 110b. In one embodiment, the UI 210 may also provide an input device to enable the user 204 to interact with the virtual assistant program 110a, 110b (e.g., by entering text or by selecting user options). According to one embodiment, the user 204 may use UI 210 to provide express consent to enable the virtual assistant program 110a, 110b to run and gather data.

According to one embodiment, the user device 208 may receive, e.g., via microphone, acoustic input that corresponds to audio data 212 in a location 214 where the user device 208 is located. The audio data 212 may include audio signals detected by the user device 208 in a surrounding environment of the location 214. In one embodiment, location 214 may be associated with the user 204 and may include, for example, a room, a house, an office, a conference room, a classroom, or any other suitable location 214 where the user 204 may want to interact with a virtual assistant.

According to one embodiment, the user device 208 may include a sleep or standby mode 216 and a wake or activated mode 218. Once the user device 208 is set up in location 214, the user device 208 may be initialized in the sleep mode 216 by default. In the sleep mode 216, the user device 208 may continuously receive audio data 212 in the location 214 and monitor the audio data 212 for a wake word 220. In one embodiment, the wake word 220 may include a pre-defined term or phrase configured to trigger activation of the user device 208 from the sleep mode 216 to the wake mode 218. Once the user device 206 is in the wake mode 216, the user device 206 may transmit (e.g., via communication network 116) the verbal input (e.g., audio data 212) from the user 204 to a server (e.g., server 112) running the virtual assistant program 110a, 110b for processing. In one embodiment, the audio processing component 206a of the virtual assistant program 110a, 110b may process the verbal language input from the user 204 to infer the user's intent and execute tasks based on the inferred intent of the user 204. In at least one embodiment, the audio processing component 206a may be implemented in the user device 208 such that the audio data 212 may be processed locally on the user device 208.

According to one embodiment, when the user device 208 detects a potential wake word 220 in the audio data 212, the virtual assistant program 110a, 110b may calculate a wake word confidence score associated with the level of certainty that the wake word 220 is in the audio data 212. If the confidence score meets or exceeds a threshold score for wake word certainty (wake word threshold), the virtual assistant program 110a, 110b may trigger activation of the user device 208 from the sleep mode 216 to the wake mode 218. If the confidence score does not meet or exceed the threshold score for wake word certainty, the virtual assistant program 110a, 110b may remain in the sleep mode 216.

According to one embodiment, the threshold component 206b of the virtual assistant program 110a, 110b may enable the user 204 to interact with the user device 208 (e.g., via UI 210) to designate a wake word threshold 222. In one embodiment, the wake word threshold 222 may vary based on situational context associated with the user 204 and the location 214. For example, the wake word threshold 222 may be different (e.g., lower threshold) for a casual context as compared to a professional context (e.g., higher threshold). In one embodiment, the casual context may include situations where the location 214 of the user device 208 is a home setting and the professional context may include situations where the location 214 of the user device 208 is an office setting. In one embodiment, the wake word threshold 222 may further vary within the casual context. For example, within the home setting, the wake word threshold 222 may be different for high/low activity context, morning/night context, child context, and any other suitable casual context. Similarly, the wake word threshold 222 may further vary within the professional context. For example, within the office setting, the wake word threshold 222 may be different for a meeting context, lunch context, town hall context, voting context, brain storming context, classroom context, and any other suitable professional context. In one embodiment, the virtual assistant program 110a, 110b may enable the user 204 to input the wake word threshold 222 for each of the contexts discussed above and any other suitable context determined by the user 204. In another embodiment, the virtual assistant program 110a, 110b may designate the wake word threshold 222 for the various contexts based on a pre-defined or global public ruleset.

According to one embodiment, the virtual assistant program 110a, 110b may process the audio data 212 received via the user device 208 to establish a context 224. In one embodiment, the context 224 may be associated with the user device 208 in the location 214. In some embodiments, the context 224 may be associated with the user 204 in relation to the surrounding environment of the location 214. More specifically, the context 224 may be associated with current actions performed by the user 204 in the location 214. In some embodiments, the context 224 may be associated with interactions between the user 204 and the surrounding environment of the location 214 and interactions between the user 204 and other people in the location 214.

In one embodiment, the audio processing component 206a and the context component 206c of the virtual assistant program 110a, 110b may continuously process the audio data 212 to determine the context 224 in the location 214 at a current time.

According to one embodiment, the virtual assistant program 110a, 110b may enable the user device 208 to record audio data 212 in location 214. In one embodiment, the recorded audio data 212 may be temporarily stored in a storage device 226 for analysis using the audio processing component 206a and the context component 206c of the virtual assistant program 110a, 110b. In one embodiment, the recorded audio data 212 may be temporarily stored in the storage device 226, processed by the virtual assistant program 110a, 110b, and overwritten by new recorded audio data 212. In one embodiment, the temporary storage in the storage device 226 may include a buffer, cache, or any other suitable temporary storage mechanism. In one embodiment, the audio processing (e.g., via audio processing component 206a) and the context processing (e.g., via context processing component 206c) of the recorded audio data 212 may take place locally using the user device 208. In another embodiment, the user device 208 may transmit (e.g., via communication network 116) the recorded audio data 212 to a remote processing server of the computer system 202 for the audio processing (e.g., via audio processing component 206a) and the context processing (e.g., via context processing component 206c) of the recorded audio data 212.

According to one embodiment, the virtual assistant program 110a, 110b may implement machine learning techniques to train a classifier (e.g., Support Vector Machine (SVM)) to learn various audio events to determine the context 224 in location 214. In one embodiment, the audio event detection may include a feature extraction process and an event classification process. In one embodiment, the virtual assistant program 110a, 110b may have access to a database of event-labeled audio clips for training the classifier to identify the audio event based on the characteristics of the extracted features. More specifically, in one embodiment, the virtual assistant program 110a, 110b may calculate the Mel Frequency Cepstral Coefficients (MFCC) of the input audio data 212 to identify the characteristic features of the audio data 212. In one embodiment, the virtual assistant program 110a, 110b may also implement an object detection model, such as, for example, a Region-based Convolutional Neural Network (R-CNN) mechanism for identifying segments or regions of the audio data 212 which may include an audio event. In one embodiment, MFCC-based speech feature extraction and speaker identification may be used as an overlay to the R-CNN mechanism for determining the context 244 in the location 214 based on the classified audio events. In one embodiment, this may enable feature extraction and feature matching based on identifying the speaker (e.g., user 204) in correlation with the context 224 in the location 214.

Figure 3:
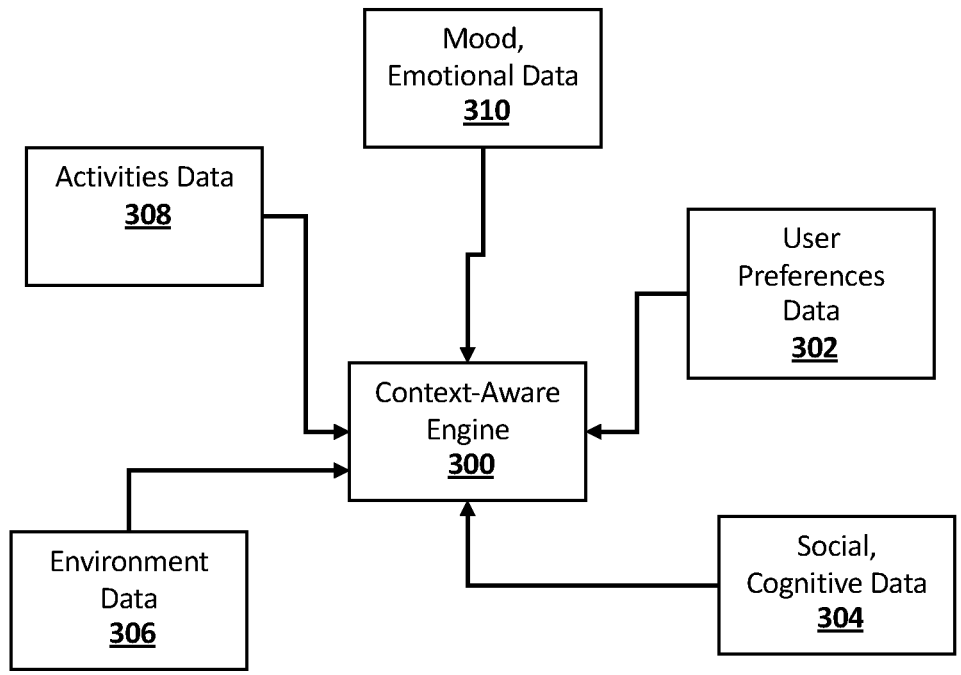
FIG. 3 is a block diagram of a context-aware engine of a virtual assistant program according to at least one embodiment.

With reference to FIG. 2 and additional reference to FIG. 3, in one embodiment, the virtual assistant program 110a, 110b may incorporate the audio data 212 with various other data sources to determine the context 224 in the location 214. In FIG. 3, a schematic diagram of a context-aware engine 300 of the virtual assistant program 110a, 110b according to at least one embodiment is depicted.

According to one embodiment, the context-aware engine 300 may be implemented as part of the context component 206c of the virtual assistant program 110a, 110b to incorporate external data sources for modeling the user 204 of the virtual assistant program 110a, 110b. In one embodiment, the context-aware engine 300 may receive user preferences data 302, social and cognitive data 304, environment data 306, activities data 308, and mood and emotional data 310. In one embodiment the user preferences data 302 may include configured data, such as, for example, user 204 designated wake word thresholds. In some embodiments, the user preferences data 302 may also identify primary users and secondary users, as well as their respective ages and genders. In one embodiment, the social and cognitive data 304 may include family information such as, the marital status and the number of children of the user 204. In some embodiments, the social and cognitive data 304 may also include information regarding the health of the user 204 (e.g., physical disability) and any user online data. In one embodiment, the environment data 306 may include information, such as, for example, the current weather condition. In one embodiment, the activities data 308 may include information, such as, for example, a current geolocation of the user 204 and calendar information (e.g., schedule, meeting, job, class) associated with the user 204. In one embodiment, the mood and emotional data 310 may include information associated with an emotional state of the user 204. In one embodiment, the virtual assistant program 110a, 110b may communicate with external services (e.g., via communication network 116) to gather one or more of the data described above. For example, the virtual assistant program 110a, 110b may communicate with calendar services, navigation services, weather services, social networking services, and any other suitable services to gather the necessary data. In some embodiments, the virtual assistant program 110a, 110b may communicate with additional user devices 208 to gather data for the context-aware engine 300. For example, the user device 208 may include a video device and the captured video data may be processed to gather the mood and emotional data 310 of the user 204, e.g., via IBM® (IBM and all IBM-based trademarks and logos are trademarks or registered trademarks of International Business Machines Corporation and/or its affiliates) Watson Discovery and R-CNN algorithm.

With reference to FIG. 2, the virtual assistant program 110a, 110b may determine the context 224 of the location 214 in real-time, based on real-time processing of the audio data 212 and the additional data gathered by the context-aware engine 300 discussed above. In one embodiment, the wake word threshold 222 may be directly correlated with the inferred context 224 of the location 214. Accordingly, as the context 224 is ascertained, the threshold component 206b may dynamically change the wake word threshold 222 to match the context 224. When a potential wake word 220 is detected in the audio data 212, the confidence score associated with the potential wake word 220 may be compared against the wake word threshold 222. According to one embodiment, the activation component 206d of the virtual assistant program 110a, 110b may be implemented to wake (e.g., wake mode 218) or activate the user device 208 in response to determining that the confidence score associated with the potential wake word 220 meets or exceeds the wake word threshold 222. However, if the confidence score associated with the potential wake word 220 is below the wake word threshold 222, the activation component 206d may not be implemented and the user device 208 may remain in the sleep mode 216.

Figure 4:
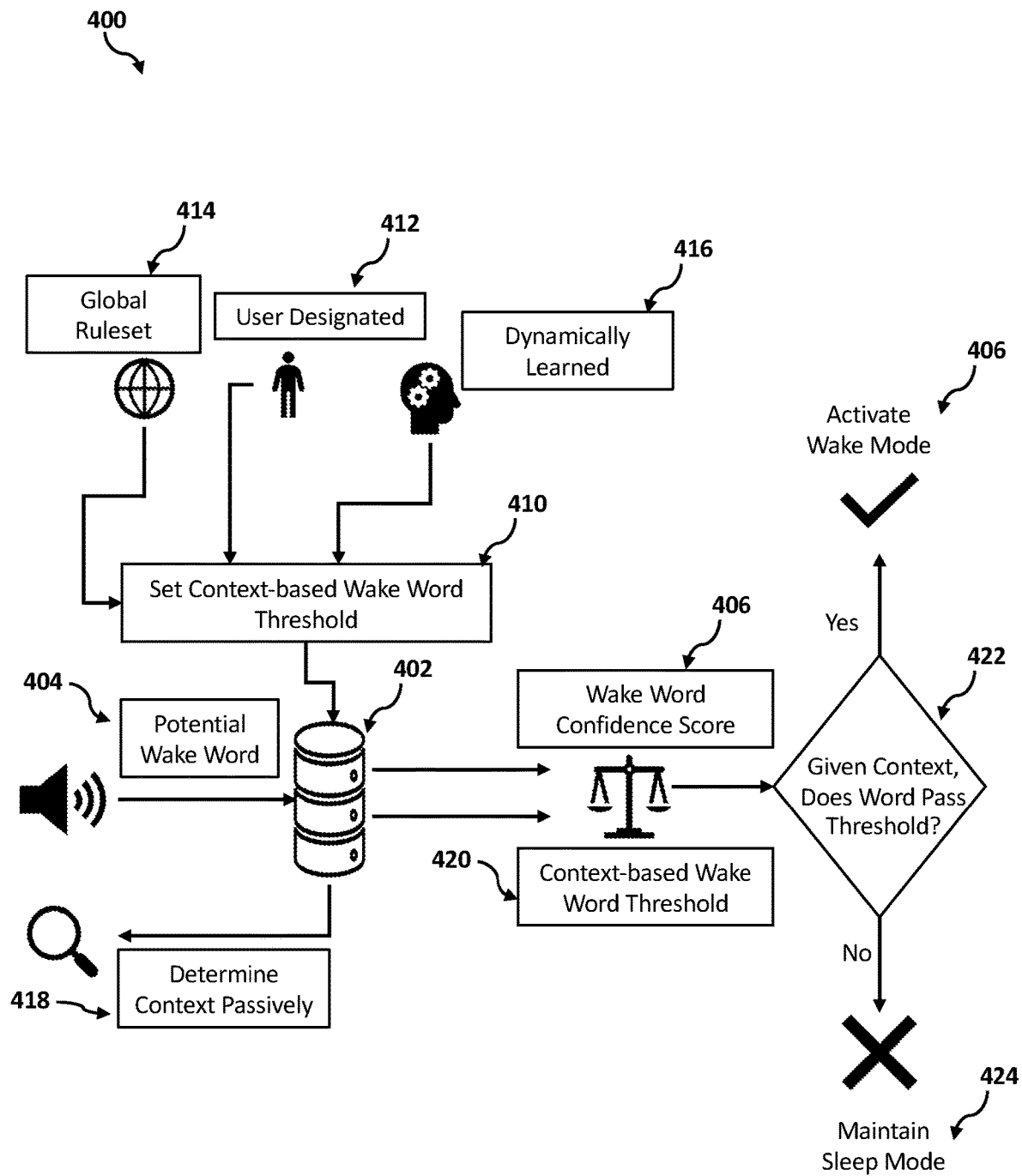
FIG. 4 is a schematic block diagram of a context-aware virtual assistant environment according to at least one embodiment.

Referring now to FIG. 4, a block diagram of a context-aware virtual assistant environment 400 according to at least one embodiment is depicted.

According to one embodiment, environment 400 may include a computing device 402 executing the virtual assistant program 110a, 110b. The computing device 402 may include a device similar to user device 208 described with reference to FIG. 2. In one embodiment, the computing device 402 may include a listening component for capturing audio data input. In some embodiments, the computing device 402 may include a video component and/or include integration with other video devices for capturing video data. In various embodiments, the virtual assistant program 110a, 110b may enable the computing device 402 to integrate with any Internet of Things (IoT) connected devices, such as, for example, an IoT calendar service for determining the context of a timeslot (e.g., scheduled meeting).

Computing device 402 may include a default sleep mode and may be activated to a wake mode by the virtual assistant program 110a, 110b, in response to detecting a wake word in an audio data input (e.g., user utterance). As described previously, the virtual assistant program 110a, 110b may run and gather data in response to express consent received from the user. Each time a potential wake word (404) is detected, the virtual assistant program 110a, 110b may calculate a wake word confidence score (406) associated with a certainty that the audio data input includes the accurate wake word. The confidence score may then be compared against a threshold to determine whether the computing device 402 should be activated to the wake mode (408). In the wake mode (408), the virtual assistant program 110a, 110b may output audio (e.g., synthesized utterance) via the computing device 402 to begin interacting with the user. In some embodiments, the virtual assistant program 110a, 110b may inaccurately accept a wrong word as the designated wake word and activate the computing device 402 unintentionally (e.g., if the threshold for accepting the wake word is too low). Such an unintentional activation of the computing device 402 may interfere with a user's other activities. In some contexts or situations, such as, for example, when a user is watching a movie (e.g., casual context), an unintentional activation of the computing device 402, including a synthesized audio response, may only cause a minor nuisance. In other contexts or situations, such as, for example, when a user is on a business call (e.g., professional context), a synthesized audio response based on an unintentional activation of the computing device 402 may cause an unprofessional interruption.

Accordingly, the virtual assistant program 110a, 110b may enable setting one or more context-based wake word thresholds (410). In one embodiment, the virtual assistant program 110a, 110b may enable the context-based wake word threshold to be set (410) by the user, e.g., user designated (412) or pre-defined using a global ruleset (414).

In some embodiment, the virtual assistant program 110a, 110b may dynamically learn (416) the context-based wake word threshold based on user actions and interactions with the computing device 402. In one embodiment, the virtual assistant program 110a, 110b may be trained to identify user actions, such as, whether a user asks the computing device 402 to be quiet when the computing device 402 outputs an audio (e.g., synthesized audio response), whether the user frequently turns off the computing device 402 at a specific time, and whether the user mutes their current conversation (e.g., a conference call) when the computing device 402 outputs an audio (e.g., synthesized audio response). In one embodiment, if the virtual assistant program 110a, 110b detects an increase in the number of ameliorative actions the user performs to reduce the functionality of the computing device 402, as described above, the virtual assistant program 110a, 110b may increase the wake word threshold based on that data.

For example, Bob may have a virtual assistant device installed in his home office which may be activated by the wake word phrase "hey Alex." While Bob is on a conference call, the virtual assistant device may detect the current professional context and dynamically set the wake word threshold to 95% based on the detected professional context. In response to Bob saying the word "flex" during the conference call, the virtual assistant device may be unintentionally activated. Bob may be frustrated that the 95% wake word threshold was not high enough to prevent the virtual assistant device from interrupting his conference call. In response to the interruption from the virtual assistant device, Bob may take the following actions: mute conference call device (action 1), verbally tell the virtual assistant device to stop (action 2), and unplug the virtual assistant device from the power source during the conference call (action 3). The virtual assistant device may detect the actions taken by Bob and determine that Bob is not happy with the current wake word threshold associated with professional contexts. Based on learning that the wake word threshold is not high enough, the virtual assistant device may dynamically increase the wake word threshold from 95% to 97%.

According to one embodiment, when the computing device 402 is connected to power, the virtual assistant program 110a, 110b may enable a default sleep mode, as described previously. While in sleep mode, the computing device 402 may continuously receive audio data from the surrounding environment. In one embodiment, the virtual assistant program 110a, 110b may process the captured audio data to detect the potential wake word (404), as described previously. In various embodiments, the virtual assistant program 110a, 110b may also process the captured audio data to determine a context (418) of the surrounding environment. As described with reference to FIG. 2, the virtual assistant program 110a, 110b may implement machine learning techniques to identify audio events and speakers in the surrounding environment based on extracting features from the captured audio data. In one embodiment, the virtual assistant program 110a, 110b may train a classifier to determine the context of the surrounding environment based on the identified audio events and speakers. In some embodiments, the virtual assistant program 110a, 110b may implement the wake word detection process (404) and the context determination process (418) concurrently and in real-time. In one embodiment, the virtual assistant program 110a, 110b may implement the context determination (418) as a passive process running in the background to determine a current context in real-time. At the same time, the virtual assistant program 110a, 110b may actively process the captured audio data to detect the potential wake word (404).

According to one embodiment, once a potential wake word is detected, the virtual assistant program 110a, 110b may calculate a wake word confidence score (406). In one embodiment, the virtual assistant program 110a, 110b may weigh the wake word confidence score (406) against a context-based wake word threshold (420) selected based on the current context in the surrounding environment. The virtual assistant program 110a, 110b may then determine (422) whether the potential wake word passes (e.g., meets or exceeds) the context-based threshold. If the wake word confidence score meets or exceeds the context-based wake word threshold, the virtual assistant program 110a, 110b may activate the computing device 402 to the wake mode (408). However, if the wake word confidence score is below the context-based wake word threshold, the virtual assistant program 110a, 110b may instruct the computing device 402 to maintain the sleep mode (424).

Figure 5:
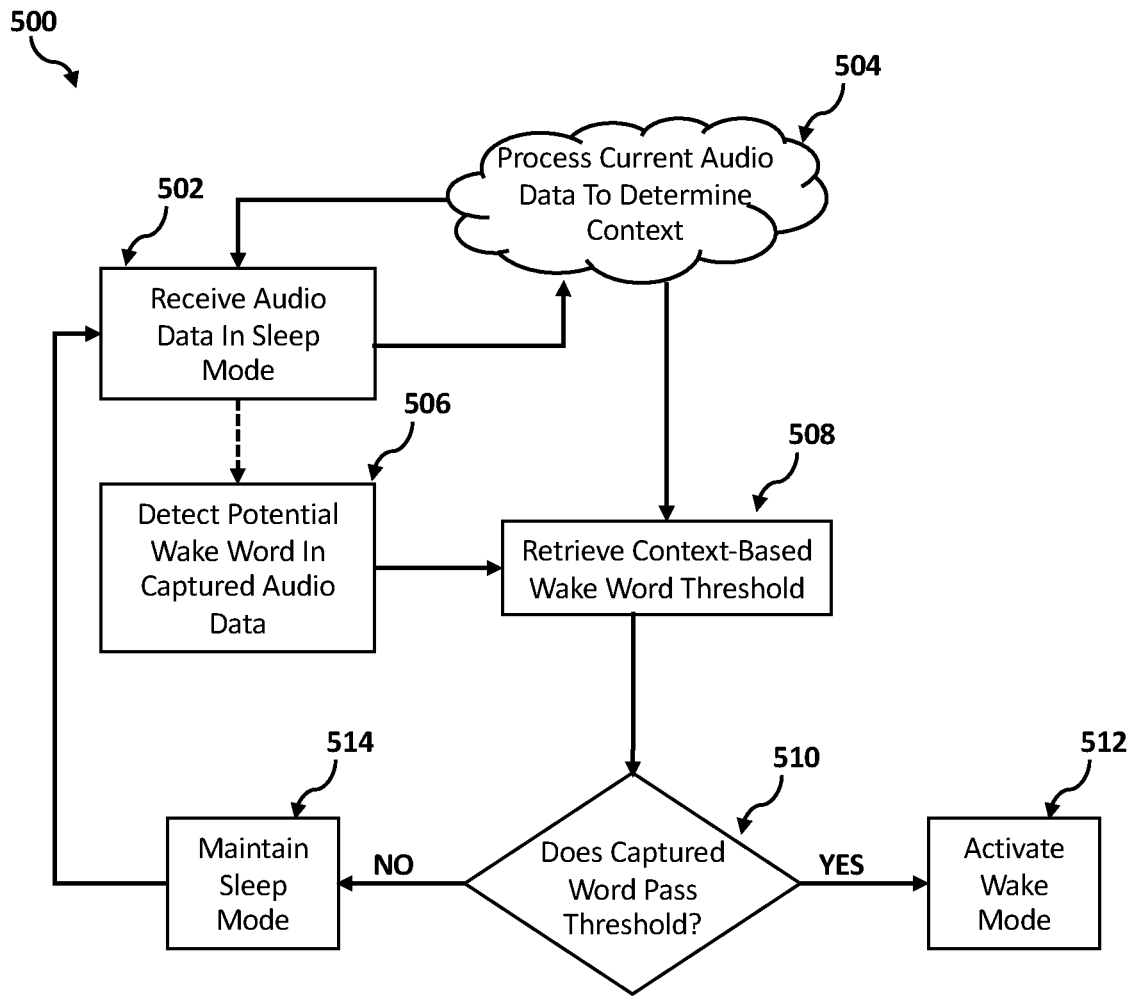
FIG. 5 is an operational flowchart illustrating a context-based wake word threshold process according to at least one embodiment.

Referring now to FIG. 5, an operational flowchart illustrating the exemplary context-based wake word threshold process 500 used by the virtual assistant program 110a, 110b according to at least one embodiment is depicted.

At 502, audio data is received in sleep mode. The virtual assistant program 110a, 110b running on a user device may implement a sleep functionality in which the user device may continuously receive audio data input from a surrounding location, as described previously with reference to FIGS. 2 and 4.

Then at 504, current audio data is processed to determine context. In various embodiments, the virtual assistant program 110a, 110b may process audio data input in real-time to determine the current context of the surrounding location. As described with reference to FIG. 2, the virtual assistant program 110a, 110b may implement machine learning techniques to identify audio events and speakers in the surrounding location based on extracting features from the captured audio data. In one embodiment, the virtual assistant program 110a, 110b may train a classifier to determine the context of the surrounding location based on the identified audio events and speakers. In one embodiment, the virtual assistant program 110a, 110b may continuously perform the context determination as a background process (e.g., passively) while actively monitoring the audio data input for the wake word.

Then at 506, a potential wake word is detected in the captured audio data. As previously described, the user device may include a default sleep mode and may be activated to a wake mode by the virtual assistant program 110a, 110b, in response to detecting a wake word in the audio data input (e.g., user utterance). Each time the potential wake word is detected, the virtual assistant program 110a, 110b may calculate a wake word confidence score associated with a certainty that the audio data input includes the accurate wake word.

Next at 508, a context-based wake word threshold is retrieved. According to one embodiment, the virtual assistant program 110a, 110b may store one or more context-based wake word thresholds. As described previously, the virtual assistant program 110a, 110b may enable the context-based wake word threshold to be designated by the user or pre-defined using a global ruleset. In some embodiment, the virtual assistant program 110a, 110b may dynamically learn the context-based wake word threshold based on user actions and interactions with the virtual assistant program 110a, 110b. In one embodiment, the virtual assistant program 110a, 110b may determine the current context based on the real-time context determination process at 504. Once the context is determined, the virtual assistant program 110a, 110b may dynamically implement the wake word threshold corresponding to the context (e.g., context-based wake word threshold).

Thereafter at 510, the virtual assistant program 110a, 110b determines whether the captured potential wake word passes (e.g., meets or exceeds) the context-based wake word threshold. If the wake word confidence score calculated for the captured potential wake word meets or exceeds the context-based wake word threshold, then at 512 ("Yes" branch), the virtual assistant program 110a, 110b may activate the user device to the wake mode. However, if the wake word confidence score is below the context-based wake word threshold, then at 514 ("No" branch), the virtual assistant program 110a, 110b may instruct the user device to maintain the sleep mode. In one embodiment, from process 514, the virtual assistant program 110a, 110b may return to process 502 in which the user device may continuously receive audio data input in the sleep mode.

Figure 6:
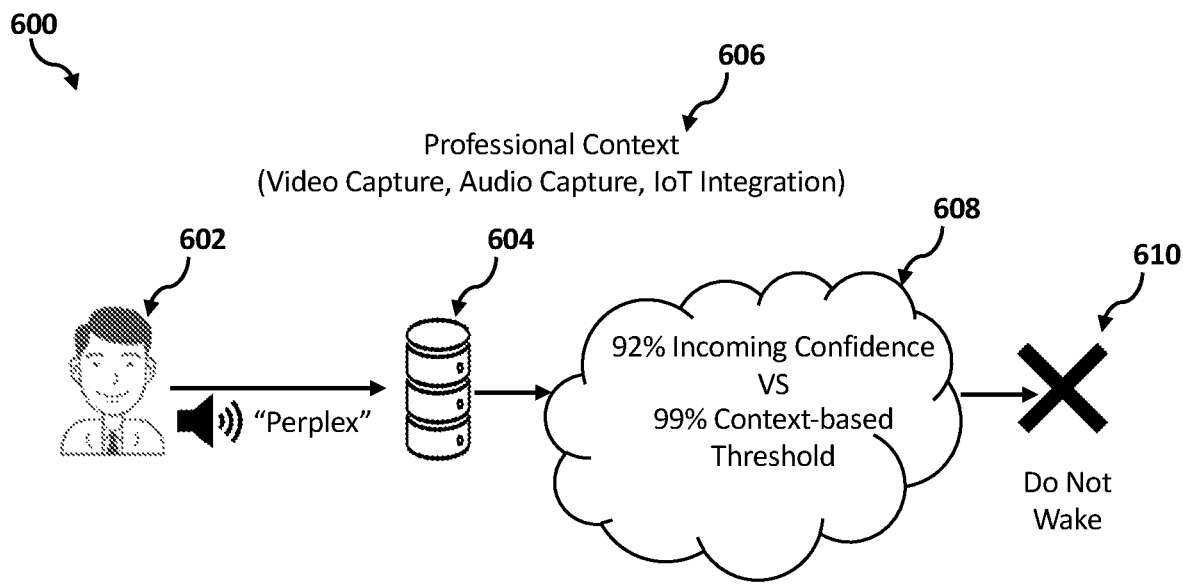
FIG. 6 is a block diagram illustrating an exemplary context-based wake word threshold process according to at least one embodiment.

Referring now to FIG. 6, an exemplary block diagram illustrating a context-based wake word threshold process 600 used by the virtual assistant program 110a, 110b according to at least one embodiment is depicted.

In process 600, Zach (user 602) may have a virtual assistant device 604 installed in his home office which may be activated by the wake word phrase "hey Alex." The virtual assistant program 110a, 110b running on virtual assistant device 604 may implement a sleep functionality in which the virtual assistant device 604 may continuously receive audio data input from Zach's home office. While in sleep mode, the virtual assistant device 604 may process the audio data input for the wake word as well as the preceding situation context in Zach's home office. While Zach is on a conference call, the virtual assistant device 604 may detect the phone conversation audio event and determine that the current context in Zach's home office is a professional context 606. In addition to the audio data, the virtual assistant device 604 may determine the professional context 606 based on video capture (e.g., via connected video device) of Zach on a phone call and/or other IoT integration (e.g., calendar). In response to the professional context 606 determination, the virtual assistant device 604 may increase the wake word threshold to 99% certainty match, such that the virtual assistant device 604 will only be activated if it is 99% certain that Zach is attempting to wake the virtual assistant device 604. Another person on the conference call utters the word "perplex", and due to the call quality and speakerphone quality, the virtual assistant device 604 misinterprets this word as the potential wake word. The virtual assistant device 604 calculates a wake word confidence score of 92% for the word "perplex". At 608, the virtual assistant device 604 compares the 92% incoming confidence score for the word "perplex" against the 99% professional context-based wake word threshold. Since the incoming wake word confidence score falls below the professional context-based wake word threshold, the virtual assistant device 604 does not wake at 610.

Figure 7:
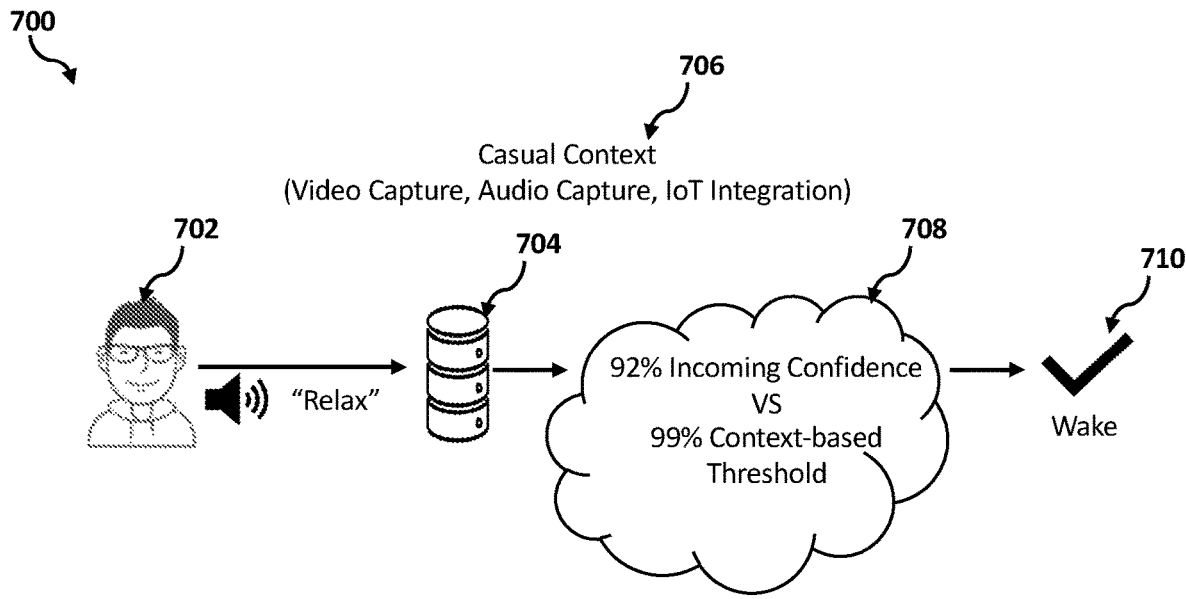
FIG. 7 is a block diagram illustrating another exemplary context-based wake word threshold process according to at least one embodiment.

Referring now to FIG. 7, an exemplary block diagram illustrating a context-based wake word threshold process 700 used by the virtual assistant program 110a, 110b according to at least one embodiment is depicted.

In process 700, after the conference call described in FIG. 6, Zach (user 702) may move to the living room to watch a television (TV) show with his friend. Zach may have another virtual assistant device 704 installed in his living room which may be activated by the wake word phrase "hey Alex." The virtual assistant program 110a, 110b running on virtual assistant device 704 may implement the sleep functionality in which the virtual assistant device 704 may continuously receive audio data input from Zach's living room. While in sleep mode, the virtual assistant device 704 may process the audio data input for the wake word as well as the preceding situation context in Zach's living room. While Zach is watching the TV show, the virtual assistant device 704 may detect the TV audio event and determine that the current context in Zach's living room is a casual context 706. In addition to the audio data, the virtual assistant device 704 may determine the casual context 706 based on video capture (e.g., via connected video device) of Zach watching TV and/or other IoT integration (e.g., smart TV). In response to the casual context 706 determination, the virtual assistant device 704 may drop the wake word threshold to 90% certainty match, such that the virtual assistant device 704 will only be activated if it is 90% certain that Zach is attempting to wake the virtual assistant device 704. The word "relax" is used in the TV show and the virtual assistant device 704 detects a possible match for the wake word phrase "hey Alex".

The virtual assistant device 704 calculates a wake word confidence score of 92% for the word "relax". At 708, the virtual assistant device 704 compares the 92% incoming confidence score for the word "relax" against the 90% casual context-based wake word threshold. Since the incoming wake word confidence score is above the casual context-based wake word threshold, the virtual assistant device 704 is activated to wake at 710. The incorrect wake word was accepted as the casual context was not a high threshold context.

The functionality of a computer (e.g., virtual assistant device) may be improved by the virtual assistant program 110a, 110b because the virtual assistant program 110a, 110b may enable the computer to leverage data ingested from surrounding audio, conversation, social activities, and user preferences in order to build a user profile and dynamically modify the wake word threshold for the computer based on the user's context.

It may be appreciated that FIGS. 2 and 7 provide only an illustration of one embodiment and do not imply any limitations with regard to how different embodiments may be implemented. Many modifications to the depicted embodiment(s) may be made based on design and implementation requirements.

Figure 8:
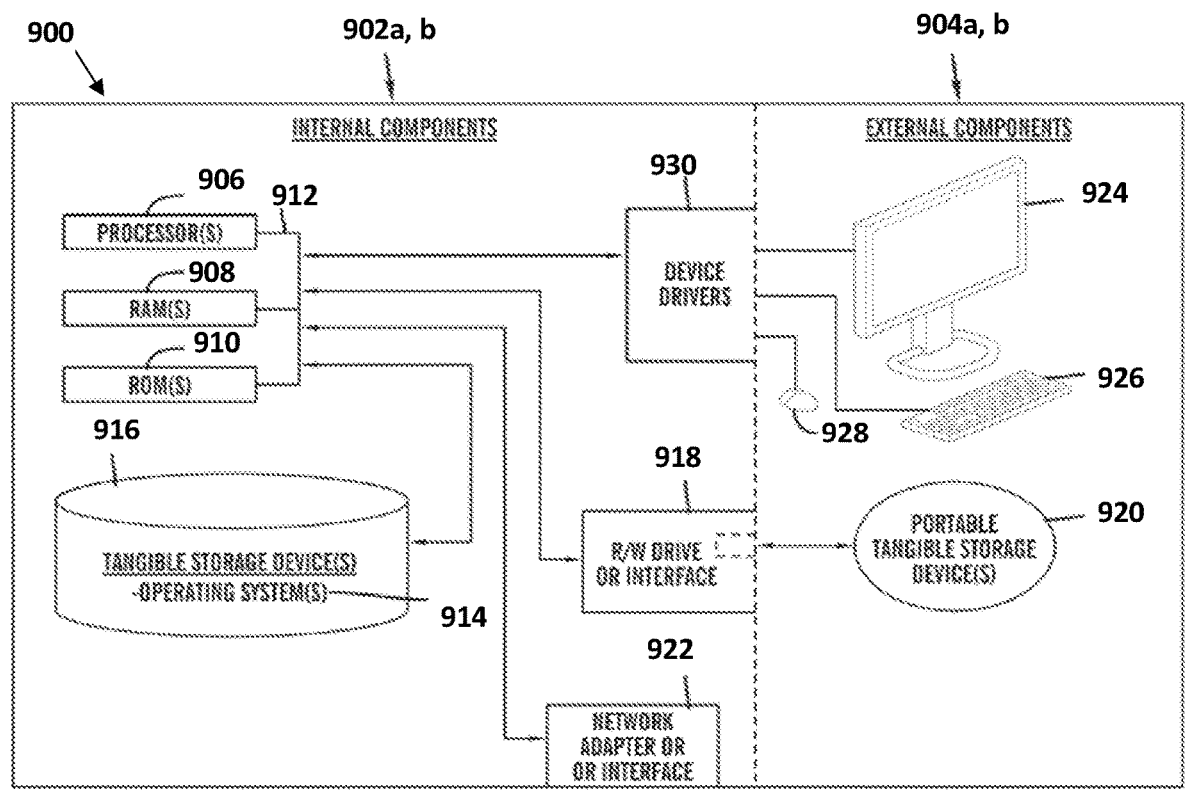
FIG. 8 is a block diagram of internal and external components of computers and servers depicted in FIG. 1 according to at least one embodiment.

FIG. 8 is a block diagram 900 of internal and external components of computers depicted in FIG. 1 in accordance with an illustrative embodiment of the present invention. It should be appreciated that FIG. 8 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 *a, b* and external components 904 *a, b* illustrated in FIG. 8. Each of the sets of internal components 902 *a, b* includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the virtual assistant program 110*a* in client computer 102, and the virtual assistant program 110*b* in network server 112, may be stored on one or more computer-readable tangible storage devices 916 for execution by one or more processors 906 via one or more RAMs 908 (which typically include cache memory). In the embodiment illustrated in FIG. 8, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 *a, b* also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the virtual assistant program 110*a* and 110*b* can be stored on one or more of the respective portable computer-readable tangible storage devices 920, read via the respective R/W drive or interface 918 and loaded into the respective hard drive 916.

Each set of internal components 902 *a, b* may also include network adapters (or switch port cards) or interfaces 922 such as a TCP/IP adapter cards, wireless wi-fi interface cards, or 3G or 4G wireless interface cards or other wired or wireless communication links. The software program 108 and the virtual assistant program 110*a* in client computer 102 and the virtual assistant program 110*b* in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the virtual assistant program 110*a* in client computer 102 and the virtual assistant program 110*b* in network server computer 112 are loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
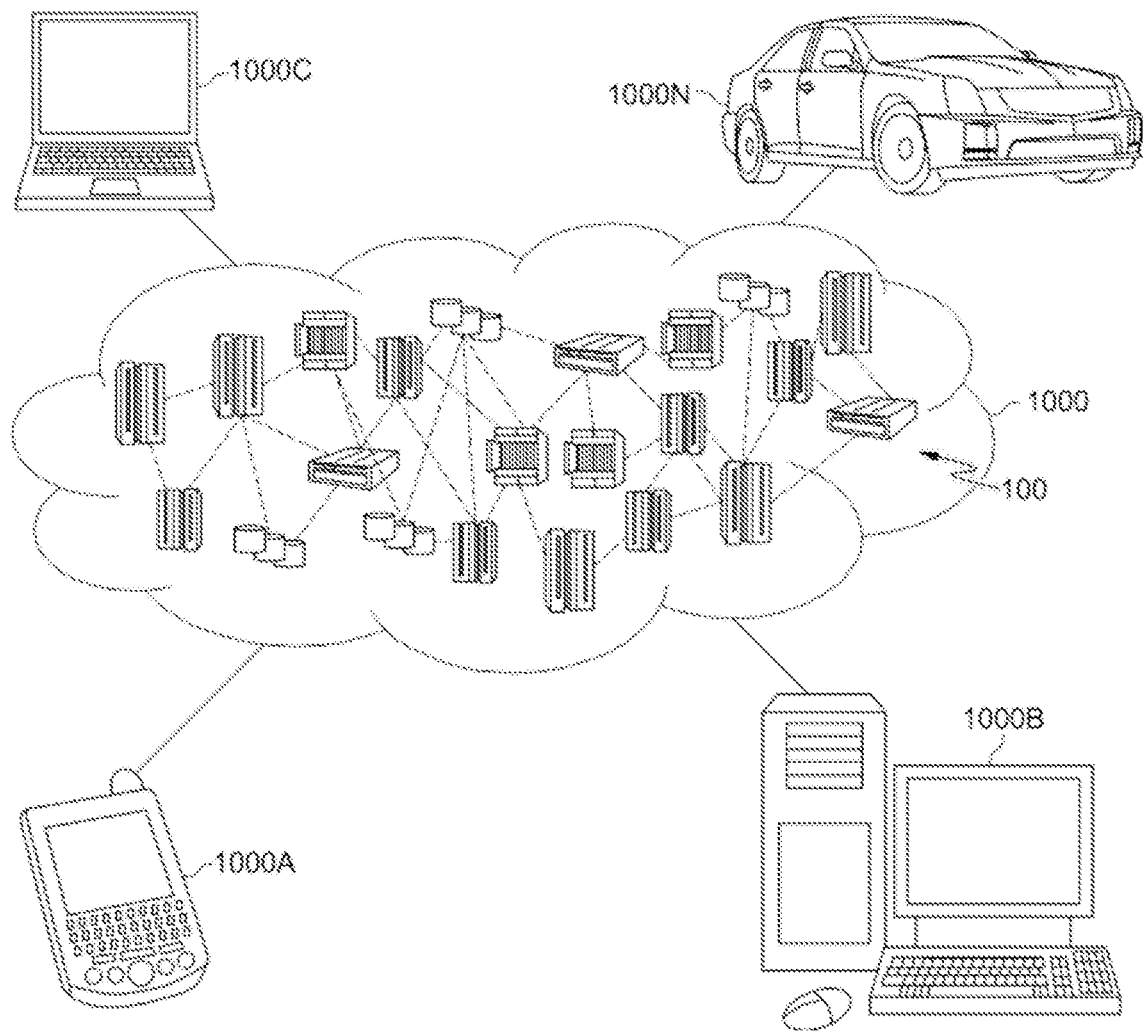
FIG. 9 is a block diagram of an illustrative cloud computing environment including the computer system depicted in FIG. 1, in accordance with an embodiment of the present disclosure.

Referring now to FIG. 9, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 9 are intended to be illustrative only and that computing nodes 100 and cloud computing environment 1000 can communicate with any type of computerized device over any type of network and/or network addressable connection (e.g., using a web browser).

Figure 10:
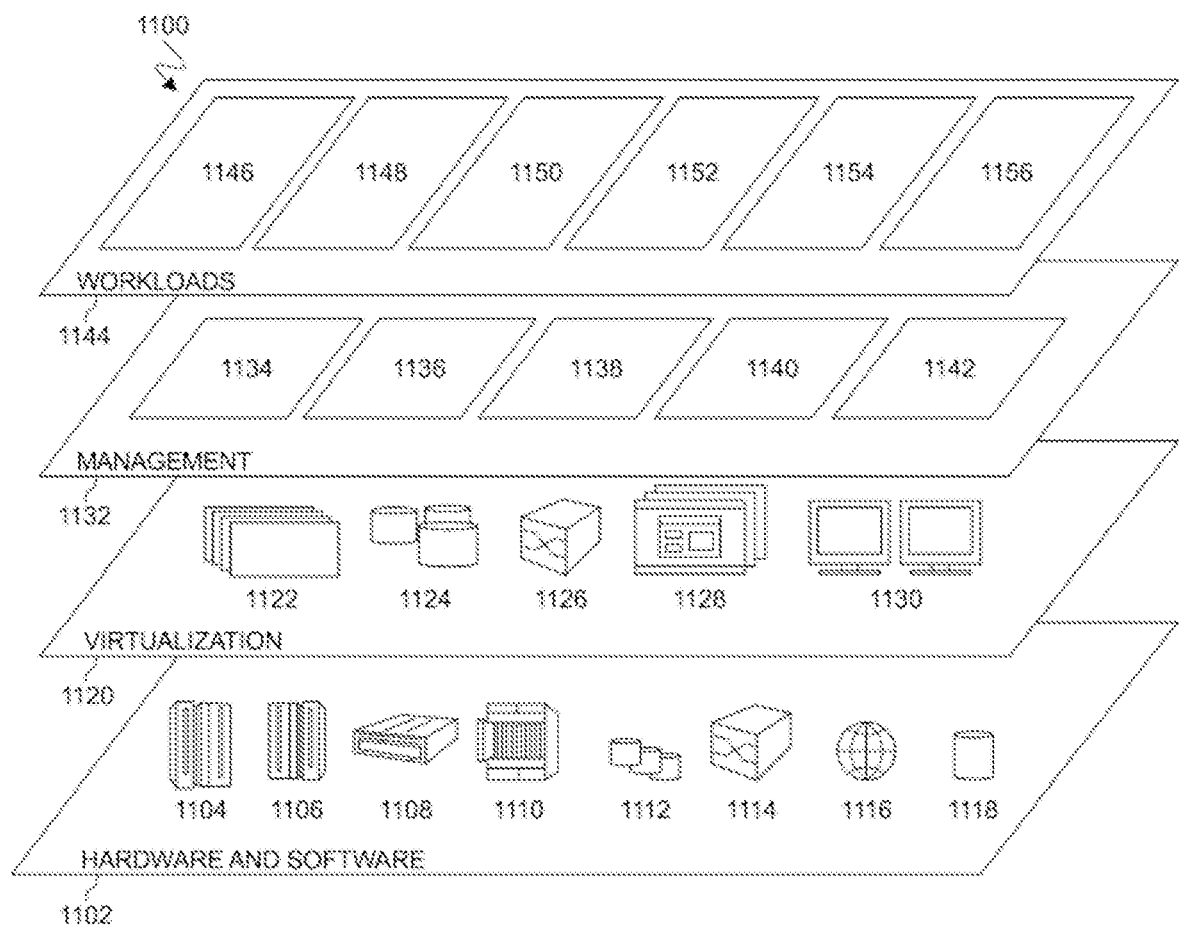
FIG. 10 is a block diagram of functional layers of the illustrative cloud computing environment of FIG. 9, in accordance with an embodiment of the present disclosure.

Referring now to FIG. 10, a set of functional abstraction layers 1100 provided by cloud computing environment 1000 is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and virtual assistance 1156. A virtual assistant program 110a, 110b provides a way to dynamically modify a wake word threshold of a computing device based on determining the context in the surrounding environment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving an audio data generated by a computing device operating in a sleep mode;
processing the received audio data to determine a context associated with a user of the computing device, wherein the context includes determining at least one interaction between the user of the computing device and a surrounding environment of the computing device based on at least one audio signal from the surrounding environment;
in response to detecting a potential wake word in the received audio data, calculating a wake word confidence score associated with an accuracy of the detected potential wake word;
retrieving a wake word threshold, wherein the wake word threshold is determined based on the context associated with the user of the computing device;
in response to the calculated wake word confidence score exceeding the retrieved wake word threshold, activating a wake mode of the computing device; and
in response to detecting a number of ameliorative actions performed by the user to reduce a functionality of the computing device in the activated wake mode, increasing the retrieved wake word threshold for the context associated with the user of the computing device, wherein the detected number of ameliorative actions performed by the user is selected from the group consisting of detecting a muting of the at least one audio signal from the surrounding environment, detecting a powering down of the computing device, and detecting a user stop command in the received audio data.

2. The method of claim 1, further comprising:
in response to the calculated wake word confidence score being less than the retrieved wake word threshold, maintaining the sleep mode of the computing device.

3. The method of claim 1, further comprising:
concurrently processing the received audio data to detect the potential wake word and determine the context associated with the user of the computing device.

4. The method of claim 1, further comprising:
in response to determining the context associated with the user, dynamically modifying the wake word threshold to match the determined context.

5. The method of claim 1, further comprising:
continuously receiving the audio data including the at least one audio signal from the surrounding environment of the computing device; and
processing the continuously received audio data in real-time to detect a current context associated with the user in relation to the surrounding environment of the computing device.

6. The method of claim 1, further comprising:
identifying at least one audio event based on an extracted feature from the received audio data; and
determining the context based on the identified at least one audio event.

7. A computer system for context-based wake word threshold modification, comprising:
one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:
receiving an audio data generated by a computing device operating in a sleep mode;
processing the received audio data to determine a context associated with a user of the computing device, wherein the context includes determining at least one interaction between the user of the computing device and a surrounding environment of the computing device;
in response to detecting a potential wake word in the received audio data, calculating a wake word confidence score associated with an accuracy of the detected potential wake word;
retrieving a wake word threshold, wherein the wake word threshold is determined based on the context associated with the user of the computing device;
in response to the calculated wake word confidence score exceeding the retrieved wake word threshold, activating a wake mode of the computing device; and
in response to detecting a number of ameliorative actions performed by the user to reduce a functionality of the computing device in the activated wake mode, increasing the retrieved wake word threshold for the context associated with the user of the computing device, wherein the detected number of ameliorative actions performed by the user is selected from the group consisting of detecting a muting of the at least one audio signal from the surrounding environment, detecting a powering down of the computing device, and detecting a user stop command in the received audio data.

8. The computer system of claim 7, further comprising:
in response to the calculated wake word confidence score being less than the retrieved wake word threshold, maintaining the sleep mode of the computing device.

9. The computer system of claim 7, further comprising:
concurrently processing the received audio data to detect the potential wake word and determine the context associated with the user of the computing device.

10. The computer system of claim 7, further comprising:
in response to determining the context associated with the user, dynamically modifying the wake word threshold to match the determined context.

11. The computer system of claim 7, further comprising:
continuously receiving the audio data including the at least one audio signal from the surrounding environment of the computing device; and
processing the continuously received audio data in real-time to detect a current context associated with the user in relation to the surrounding environment of the computing device.

12. The computer system of claim 7, further comprising:
identifying at least one audio event based on an extracted feature from the received audio data; and
determining the context based on the identified at least one audio event.

13. A computer program product for context-based wake word threshold modification, comprising:
one or more computer-readable storage media and program instructions collectively stored on the one or more computer-readable storage media, the program instructions executable by a processor to cause the processor to perform a method comprising:

receiving an audio data generated by a computing device operating in a sleep mode;

processing the received audio data to determine a context associated with a user of the computing device, wherein the context includes determining at least one interaction between the user of the computing device and a surrounding environment of the computing device;

in response to detecting a potential wake word in the received audio data, calculating a wake word confidence score associated with an accuracy of the detected potential wake word;

retrieving a wake word threshold, wherein the wake word threshold is determined based on the context associated with the user of the computing device;

in response to the calculated wake word confidence score exceeding the retrieved wake word threshold, activating a wake mode of the computing device; and in response to detecting a number of ameliorative actions performed by the user to reduce a functionality of the computing device in the activated wake mode, increasing the retrieved wake word threshold for the context associated with the user of the computing device, wherein the detected number of ameliorative actions performed by the user is selected from the group consisting of detecting a muting of the at least one audio signal from the surrounding environment, detecting a powering down of the computing device, and detecting a user stop command in the received audio data.

14. The computer program product of claim 13, further comprising:

in response to the calculated wake word confidence score being less than the retrieved wake word threshold, maintaining the sleep mode of the computing device.

15. The computer program product of claim 13, further comprising:

in response to determining the context associated with the user, dynamically modifying the wake word threshold to match the determined context.

16. The computer program product of claim 13, further comprising:

continuously receiving the audio data including the at least one audio signal from the surrounding environment of the computing device; and processing the continuously received audio data in real-time to detect a current context associated with the user in relation to the surrounding environment of the computing device.

17. The computer program product of claim 13, further comprising:

identifying at least one audio event based on an extracted feature from the received audio data; and determining the context based on the identified at least one audio event.

* * * * *